A. McArthur,
Self Raker.

No. 113,321.     Patented Apr. 4, 1871.

Witnesses.
Alex. Mahon
H. H. Doubleday

Alexander McArthur
by his Attorney
A. M. Ruth

UNITED STATES PATENT OFFICE.

ALEXANDER McARTHUR, OF BOONEVILLE, MISSOURI.

IMPROVEMENT IN HARVESTER-RAKES.

Specification forming part of Letters Patent No. 113,321, dated April 4, 1871.

*To all whom it may concern:*

Be it known that I, ALEXANDER McARTHUR, of Booneville, Cooper county, Missouri, have invented certain new and useful Improvements in Harvester-Rakes, of which the following is a full, clear, and exact description, reference being had to the accompanying drawing, making part of this specification, in which—

Figure 1:
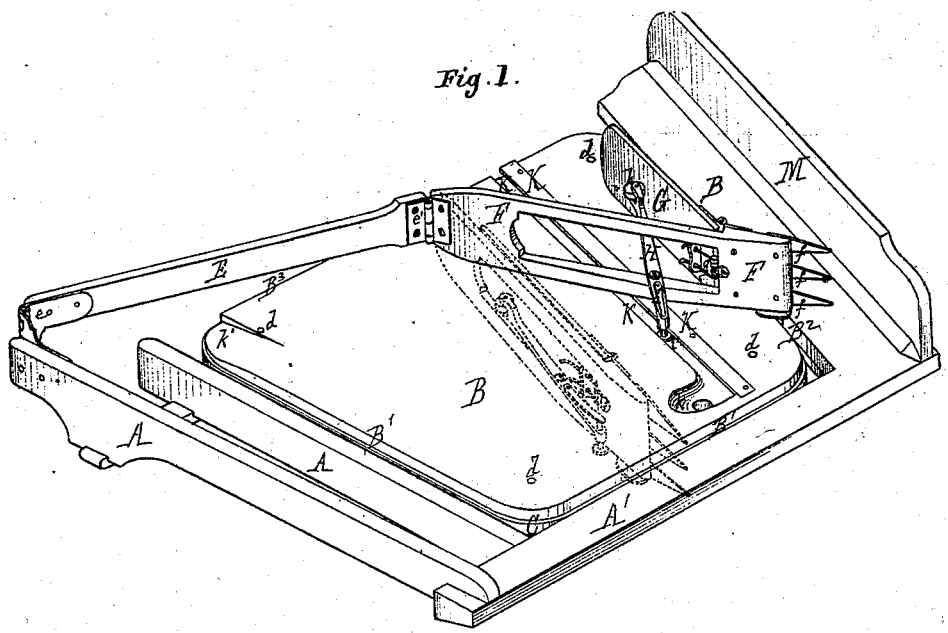
Figure 2:
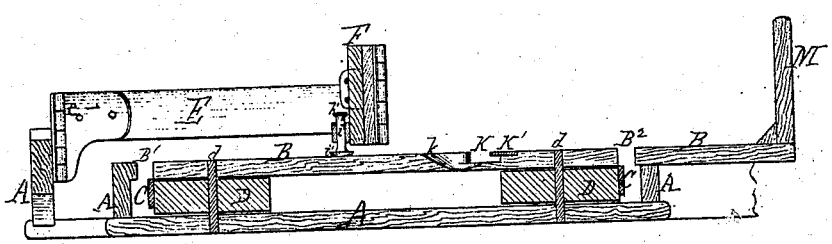

Figure 1 is a perspective view of the grain-platform and rake attachment taken from the outer front corner of the platform, and Fig. 2 is a transverse vertical section of the same.

Similar letters of reference denote corresponding parts in both figures.

My invention has for its object the improvement of what is known as the "Wood rake," consisting of a jointed stale, hinged at its rear end to the rear outer corner of the platform, and provided with an intermediate joint, and the rake-head of which is connected to and operated by an endless belt or chain, the path of which conforms, substantially, to the configuration of the grain-platform, in such manner that the rake-teeth receive a movement conforming to the shape of the platform, causing them to reach forward outside the grain on the platform, then to sweep across said platform, and, finally, to move backward at the inner side thereof, discharging the grain behind its inner rear corner, out of the way of the machine on its next round.

My invention consists in the combination, with a rake thus arranged and operated, of a hinged compressor or gaveling wing-board, operated to compress the gavel against the inner grain-guard or fender of the platform by means of a pivoted lever connected with the rake-head, and provided at one end with a pin or roller working in a groove in the platform, as hereinafter set forth.

In the drawing, A A' represent a platform-frame, of which A' may be the finger-bar of the cutting apparatus; or it may be independent thereof, so as to be connected with or disconnected from said bar, as desired. B is the grain-platform or flooring of the frame A, provided at B B¹ B² with slots, which, in connection with the rear edge of the platform at B³, form a path conforming to that of the endless rake-driving belt or chain C. This belt or chain is mounted on pulleys or sprocket-wheels D, mounted on upright shafts or pivots at d, and arranged one at each corner or change in the direction of the belt or chain, one of said pulleys or wheels forming the driving-wheel through which motion is communicated to the endless rake-driving belt C. E is the rake-stale, pivoted or hinged at e to the rear outer corner of the platform-frame A by a hinge of any suitable construction, and which will permit the required horizontal vibrations of the rake-stale. Said stale E has the rake-head or arm F connected to it at its outer or swinging end by a hinge-joint at e', upon which said head or arm is free to vibrate horizontally in its movements around and over the platform. The arm or head E is provided at its forward end with a vertical pin or stud, which projects downward therefrom through the slot in the platform, and connects said head with the endless carrying belt or chain C, in such manner that said forward end of the rake-head is carried with and made to conform in its movements to the path of said belt. The extreme forward end of arm or head F is provided with teeth or fingers *f*, forming the fork or rake, and which enter the grain, and serve, in connection with the arm F and wing-board G, hereinafter described, to move the grain across, compress, and discharge the gavel, as will be hereinafter explained.

The arm or head is slotted, as shown in the drawing, or it may be made in the form of a light open frame, if preferred, and at or near its forward end has hinged to it the forward end of a wing-compressor or gaveling-board, G. A spring, *g*, is connected with the wing-board and with the rake-arm, or with the joint connecting the two, in such manner that the tension of the spring, when not overcome by means hereinafter described, will tend to keep said wing-board forced closely up against the rake-arm, as shown in the dotted lines, Fig. 1. H is a lever, pivoted at or near midway of its length to the lower horizontal bar of the open or slotted rake-arm, and provided at its rear end with a head or friction-roller, *h*, which rests against the face of the wing-board adjacent to the rake-arm. The forward end of the lever H is slightly enlarged, and is perforated to receive a vertical sliding pin, *i*, fitting therein, and prevented from dropping out by being slightly enlarged or upset, to form a head which fits a corresponding recess or countersink in the face of the lever. The pin $i$ is held down by the tension of a spring, $h'$, attached to lever H; or said lever may be made in the form of a spring, with the pin attached and held down thereby, if preferred.

The platform is grooved at K in a line about parallel with, or slightly diverging rearward from, the inner longitudinal slot at $B^2$ in the platform, and a ledge or strip, $K'$, of metal or other suitable material, formed upon or attached to the platform at the inner side of the groove gives to said groove an L shape. (Shown in Fig. 2.) $k$ is an inclined plane or path formed in the platform at the forward end of groove K, and $k'$ is a second incline, formed at the rear outer corner of the platform, adjacent to the slot $B^1$, for purposes that will now be explained.

Supposing the parts to be in position represented in Fig. 1, with the rake-head and its attachments shown in dotted lines, and the carrying-belt C to be moving in the direction indicated by the arrows, the forward end of the rake-head, through its connection with said belt, as explained, will be carried inward, carrying the grain on the platform with it, until the pin $i$ reaches the incline $k$, and, through the pressure of the spring $h'$, is caused to descend the same, and, moving forward or inward a flange-head or button, $i'$, on the lower end of pin $i$, passes into the groove K and underneath the ledge $K'$, against which the pin $i$ rests, thereby stopping any further inward movement of the forward end of lever H, to which said pin is attached. A continued inward movement of the rake-head consequently causes lever H to be vibrated on its pivotal connection with the rake-head, and the wing-board or compressor is forced, by the rear end of said lever acting thereon, to move outward or away from the rake-head into a position parallel, or nearly so, with the fender or grain-guard M, as shown in full lines in Fig. 1, thereby compressing the grain between the wing-board and fender, when, by the continued movement of the belt, the rake, with the wing-board maintained in the described relation to the fender, is drawn backward and outward, carrying the gavel with it, and causing it to be discharged in compact form at the rear inner corner of the platform, out of the way of the team and machine on the next round. The instant this is effected the pin $i$ escapes at the open rear end of slot or groove K, and the hinged wing-board or compressor is retracted by spring $g$ to its former position against the rake-head, and the rake is carried in rear of the grain on the platform to the outer rear corner of said platform, when, as it begins its forward reaching movement outside of the grain lying on the platform, the pin $i$ rides up the incline $k'$ and moves over the face of the platform, being held up thereby until it again reaches and descends incline $k$, to enter groove K, as before.

The platform may be provided at its outer end with any suitable form of raised grain-deflecting board which will, by its inclined position, throw the grain inward upon the platform, thereby forming a track outside the grain, which will permit the forward reach of the rake without disturbing the grain until the limit of its forward throw is attained.

Having now described my invention, what I claim as new, and desire to secure by Letters Patent, is—

1. Rake-head F, compressor G, and lever H, in combination with the groove K, these parts being arranged for joint operation, substantially as described.

2. In combination with the rake-head F and compressor G, the lever H and spring-pin $i$, or its equivalent, and groove K, provided with inclines $k\ k'$, substantially as set forth.

ALEXR. McARTHUR.

Witnesses:
 JOHN COSGROVE,
 M. MCMILLAN.